A. COPONY.
MEANS FOR SUPPORTING AUTOMOBILES IN FREIGHT CARS.
APPLICATION FILED JULY 15, 1916.
1,204,947.
Patented Nov. 14, 1916.
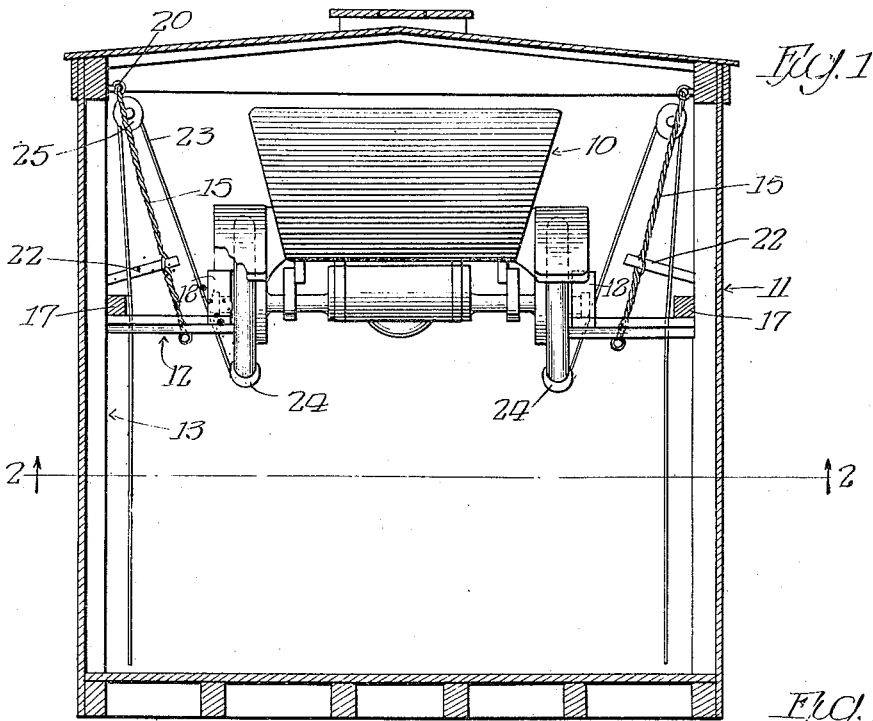
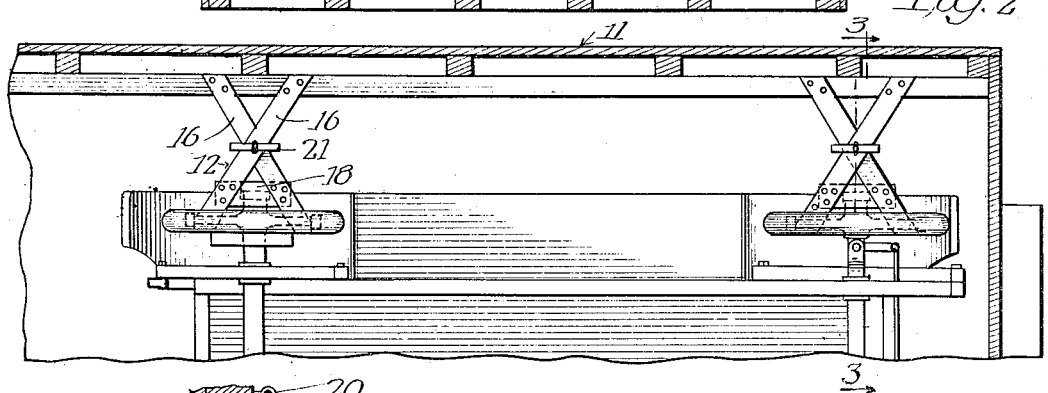
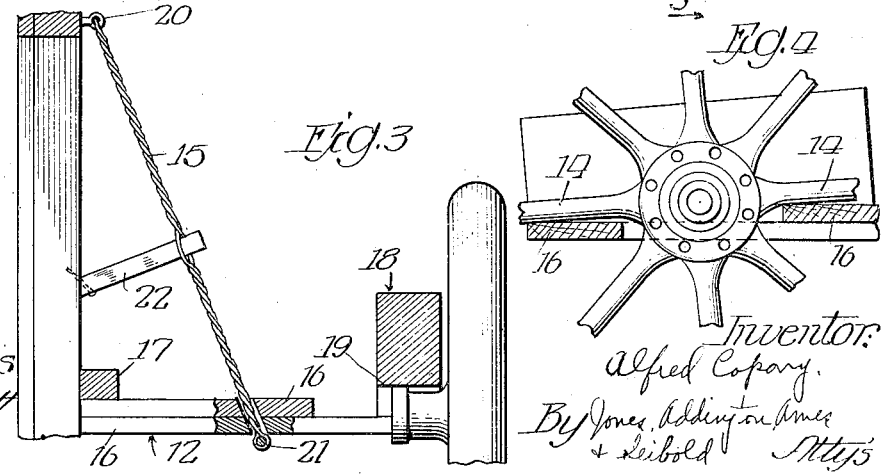
Witnesses
H. G. Barritt
Inventor
Alfred Copony.
By Jones, Addington, Ames
& Seibold, Attys

UNITED STATES PATENT OFFICE.

ALFRED COPONY, OF CHICAGO, ILLINOIS.

MEANS FOR SUPPORTING AUTOMOBILES IN FREIGHT-CARS.

1,204,947. Specification of Letters Patent. Patented Nov. 14, 1916.

Application filed July 15, 1916. Serial No. 109,542.

*To all whom it may concern:*

Be it known that I, ALFRED COPONY, subject of the Emperor of Austria-Hungary, residing at Chicago, in the county of Cook and State of Illinois, have invented new and useful Improvements in Means for Supporting Automobiles in Freight-Cars, of which the following is a full, clear, concise, and exact description, reference being had to the accompanying drawing, forming a part of this specification.

My invention relates to means for supporting automobiles in freight cars.

Among the objects of my invention is to provide improved means for supporting the upper tier of automobiles in a freight car in such a manner that the supporting means will not interfere with the lower tier and in which the automobiles will be compactly arranged and in which it is not necessary to remove the wheels of the upper tier of automobiles.

In the drawings, in which one embodiment of my invention is shown Figure 1 is a transverse vertical section of a freight car showing an automobile of the upper tier supported in place therein; Fig. 2 is a horizontal section on the line 2—2 of Fig. 1; Fig. 3 is a vertical section on the line 3—3 of Fig. 2; and Fig. 4 is a side elevation of the parts shown in Fig. 3.

Referring to the drawings in detail the means for supporting the automobile 10 of the upper tier of automobiles in the freight car 11 comprise a member 12 having portions secured to the side construction 13 of the car, and portions constructed and positioned to form rests for the spokes 14 of the automobile wheels, and a tension member 15 secured at its lower end to the member 12 and at its upper end to the car. The member 12 comprises two short beams 16 crossing each other each beam having one end secured to a cleat or rail 17 secured to the side of the car, and its other end extending into position to form a rest for the spoke of the automobile wheel. The automobile wheel is securely held in position on the beams 16 by means of a block 18 extending between and secured to a beam 16 and having a notch 19 in which the hub of the wheel fits. The tension member 15 may be a loop of wire or cable having its upper end secured to an eye bolt or screw-eye 20 and its lower end extending through openings in the beams 16 and embracing the bar 21 between said beams. For raising the spoke engaging ends of the beams 16 a stick 22 may be inserted in the loop and turned around to twist up the loop. When the beams 16 have been raised sufficiently the stick 22 may be secured to the side of the car in any suitable manner to prevent the loop untwisting. The automobile 10 may be raised into position in any suitable manner as by ropes 23 secured at one end to the wheel engaging members 24 and running over pulleys 25 secured to the screw-eye 20.

In loading the automobiles those for the upper tier are hoisted into the upper end of the car by means of the ropes 23 and pulleys 25. The supporting members 12 are then placed in position and tightened up by means of the stick 22 to firmly support the spokes. The stick 22 is then nailed to the side of the car and the rope and pulley may then be removed leaving the automobile supported on the members 12.

Having thus described my invention what I claim as new and desire to secure by Letters Patent is:—

1. The combination with a freight car, of means for supporting an automobile therein comprising two elongated members crossing each other, each having an end secured to the car, the other ends being constructed and positioned to support the spokes of the wheels of the automobile.

2. The combination with a freight car, of means for supporting an automobile therein comprising two elongated members crossing each other, each having an end secured to the side construction of the car, the other ends being constructed and positioned to support the spokes of the wheels of the automobile.

3. The combination with a freight car, of means for supporting an automobile therein comprising two elongated members crossing each other, each having an end secured to the side construction of the car, the other ends being constructed and positioned to support the spokes of the wheels of the automobile, and a tension member having one end secured to the car and the other end secured to said elongated members.

4. The combination with a freight car, of means for supporting an automobile therein comprising two elongated members crossing each other, each having an end secured to the side construction of the car, the other ends being constructed and positioned to support the spokes of the wheels of the automobile, and means for raising the spoke supporting ends of said elongated members.

5. The combination with a freight car, of means for supporting an automobile therein comprising two elongated members crossing each other, each having an end secured to the side construction of the car, the other ends being constructed and positioned to support the spokes of the wheels of the automobile, and a member extending between the spoke supporting ends of said elongated members provided with means for positioning the hub of the wheel.

6. The combination with a freight car, of means for supporting an automobile therein comprising a supporting member having a portion secured to the side construction of the car, and a portion constructed and positioned to form a rest for the spokes of the wheel of the automobile.

In witness whereof, I have hereunto subscribed my name.

ALFRED COPONY.